United States Patent [19]

Hague et al.

[11] 4,008,647
[45] Feb. 22, 1977

[54] MACHINE TOOLS

[75] Inventors: Robert Z. Hague, Oradell; George J. Loos, Parsippany, both of N.J.; Matthew F. Marsicano, Forest Hills, N.Y.

[73] Assignee: Textron, Inc., Providence, R.I.

[22] Filed: Apr. 9, 1975

[21] Appl. No.: 566,375

Related U.S. Application Data

[62] Division of Ser. No. 501,865, Aug. 30, 1974.

[52] U.S. Cl. .................................. 90/11 R; 74/335; 408/133
[51] Int. Cl.² ....................... B23Q 5/12; B23Q 3/00
[58] Field of Search ............... 408/124, 128, 133; 90/11 R, 11 A; 74/335, 665 R, 665 A, 665 F, 665 G; 192/67 R, 30 W, 84 P, 84 T, 82 P

[56] References Cited

UNITED STATES PATENTS

| 1,815,032 | 7/1931 | Boughton | 408/124 X |
|---|---|---|---|
| 2,370,885 | 3/1945 | Sohm | 408/124 X |
| 2,788,675 | 4/1957 | Hosea | 74/335 X |
| 2,915,910 | 12/1959 | Dickas | 74/335 X |
| 2,992,565 | 7/1961 | Hansen et al. | 74/335 X |

FOREIGN PATENTS OR APPLICATIONS 1,000,562   8/1965   United Kingdom ............... 74/335

*Primary Examiner*—Othell M. Simpson
*Assistant Examiner*—Z. R. Bilinsky
*Attorney, Agent, or Firm*—Arthur A. Johnson

[57] ABSTRACT

There is disclosed a spindle unit for machine tools in which the spindle is rotated by a change speed mechanism comprising a drive sleeve splined and slidable axially in the spindle and a gear shift sleeve slidable with the drive sleeve and having a bull gear adapted in one position to engage a driving gear driven by a motor and in another axial position to cause a clutch element to engage a companion clutch element connected to a pulley also driven by the motor. There are pneumatic means for moving the sleeve to cause the bull gear to disengage said drive gear to free the spindle for independent hand rotation when setting up or adjusting the mechanism. The spindle driving means includes gear shift means to cause the drive sleeve and spindle to selectively rotate at high speed, low speed or be in neutral.

11 Claims, 24 Drawing Figures

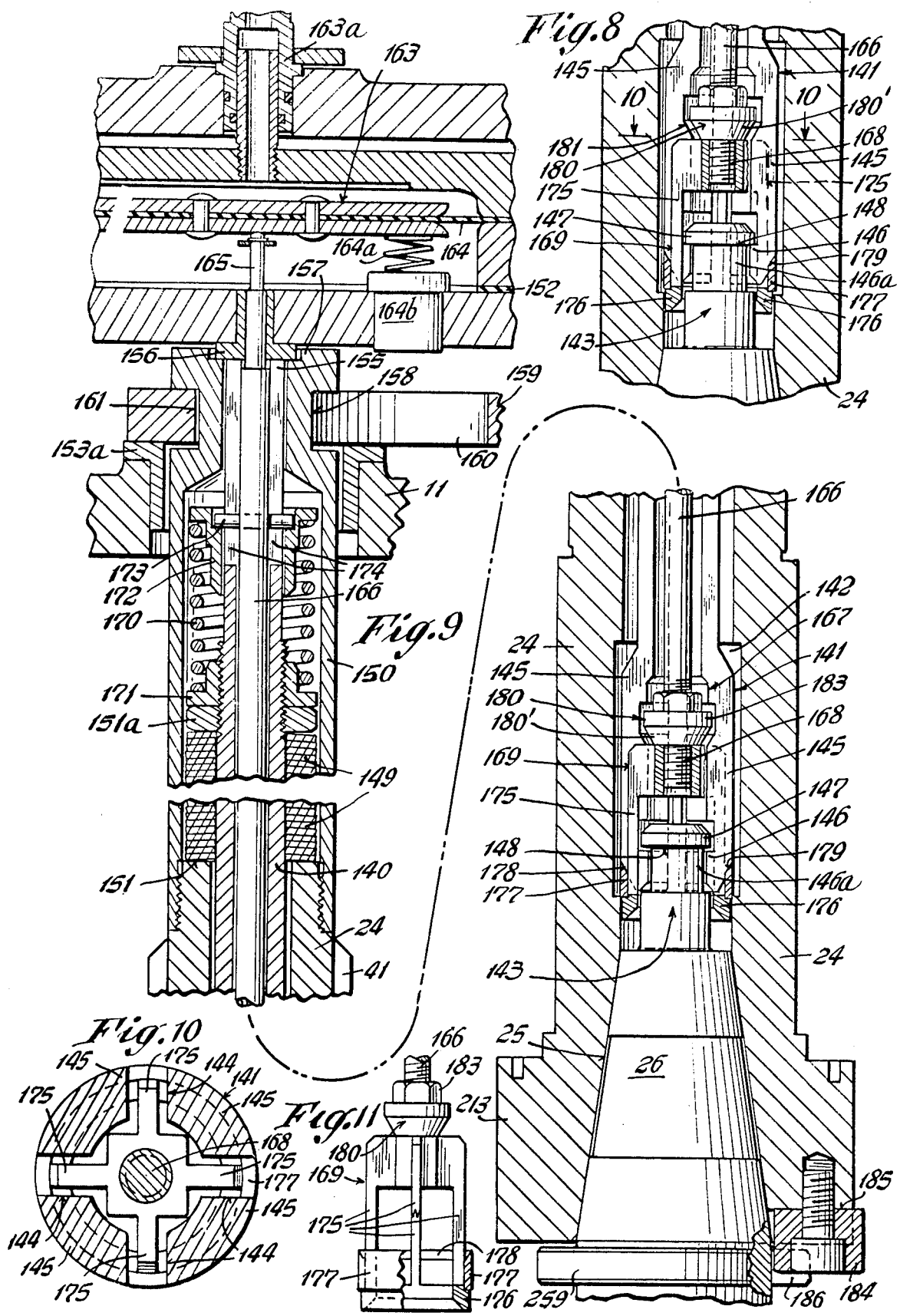

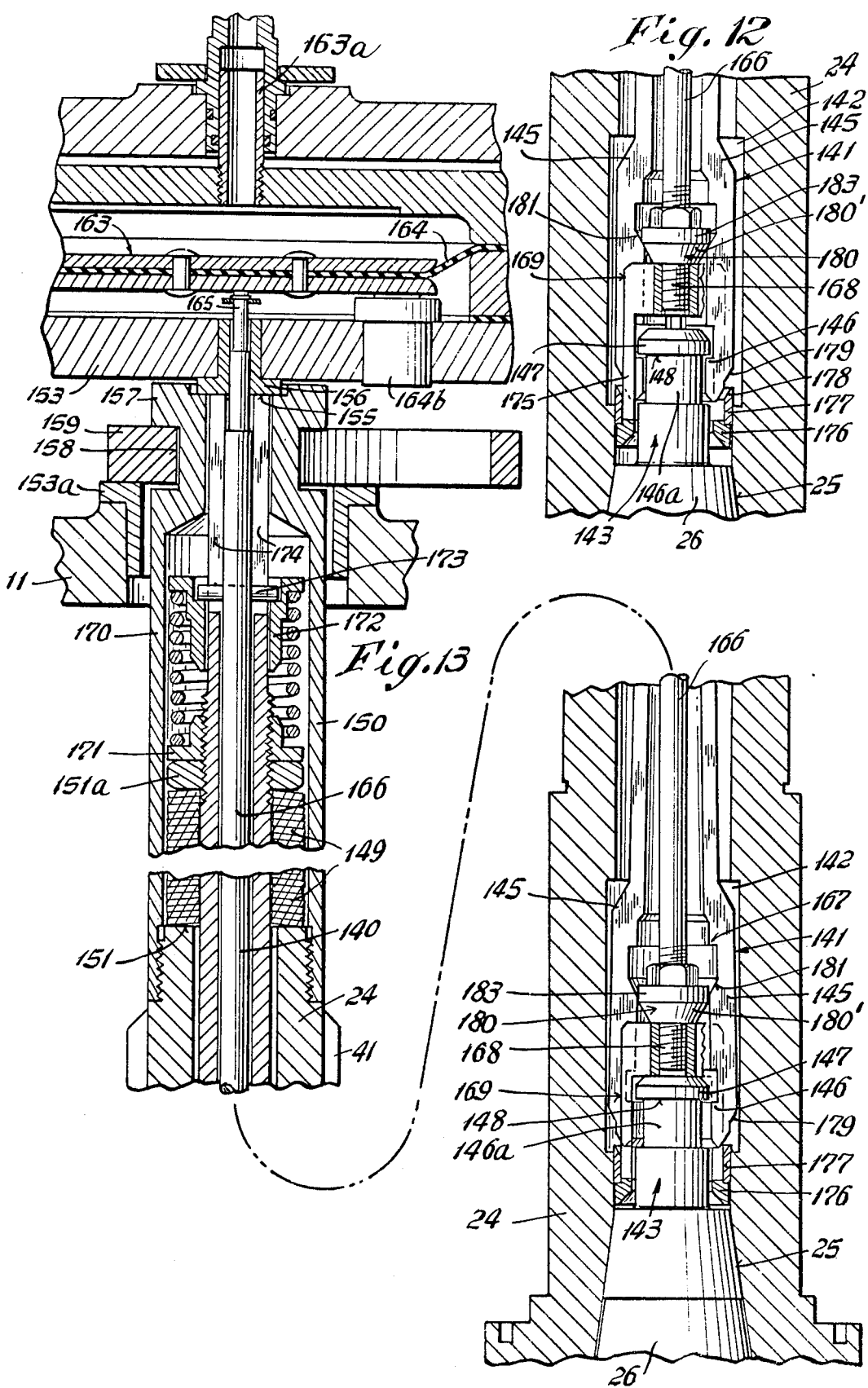

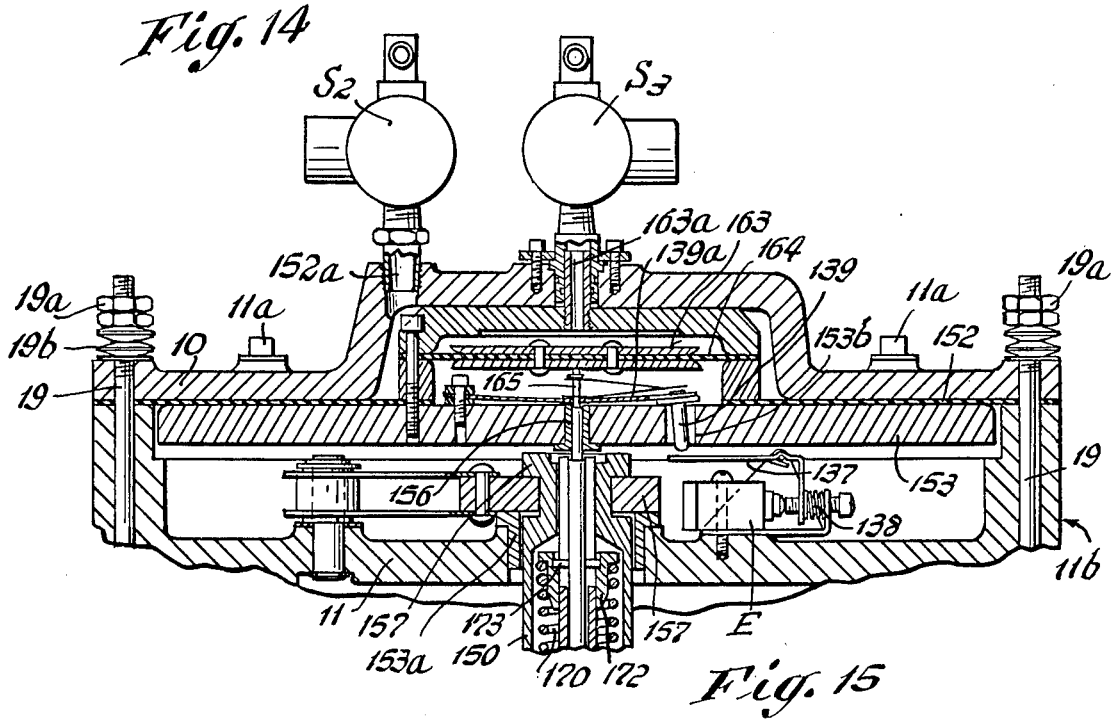
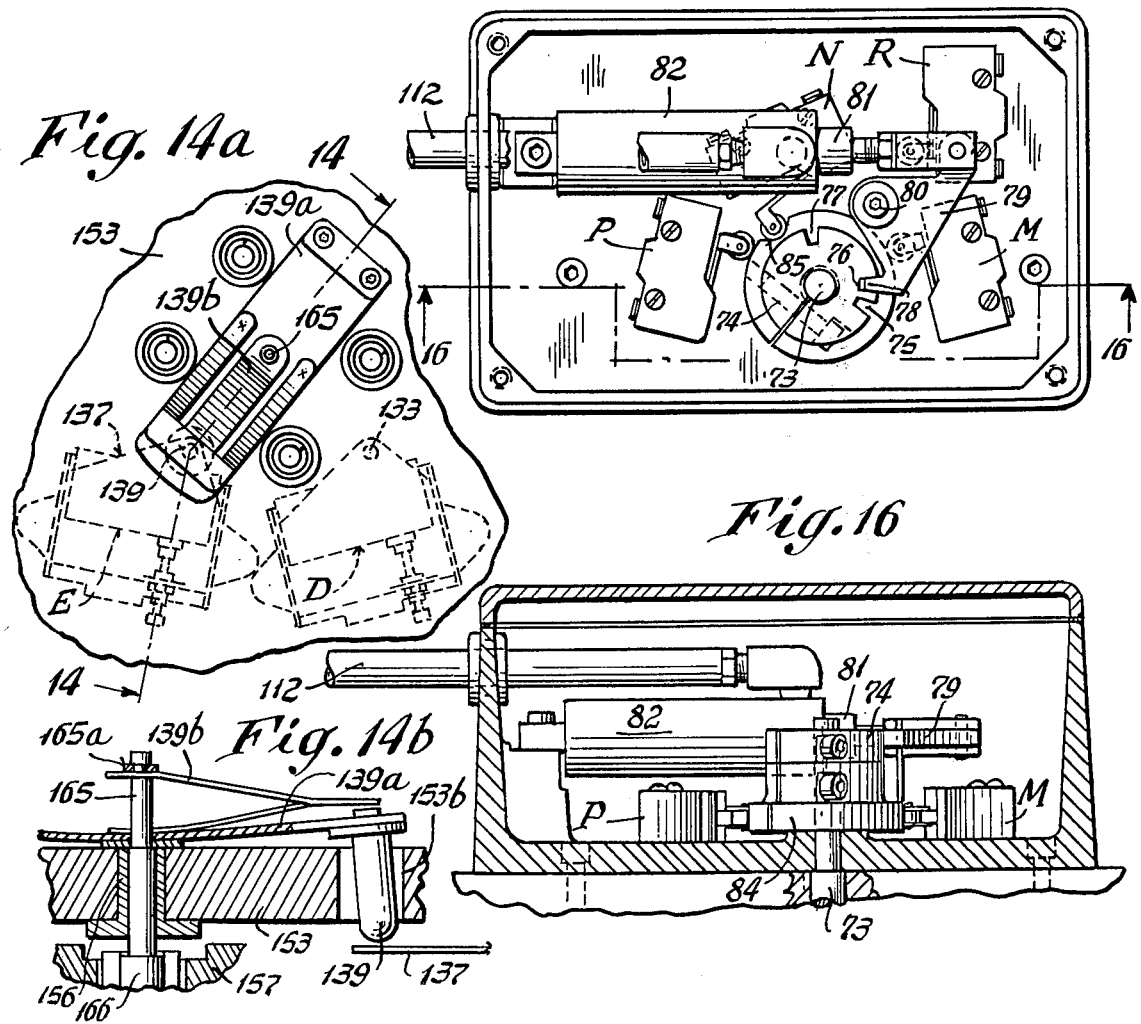

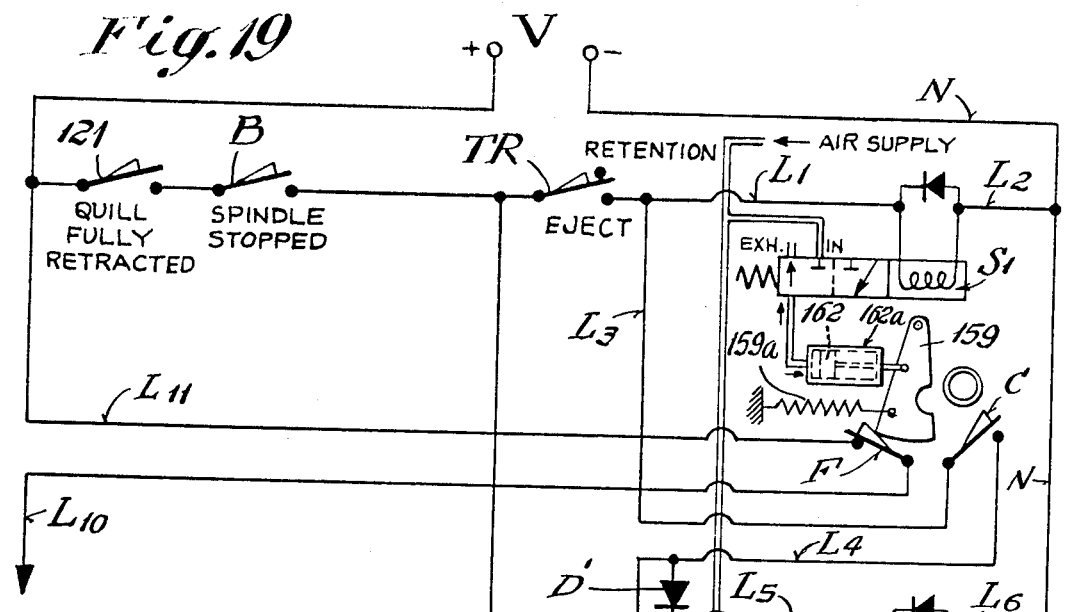
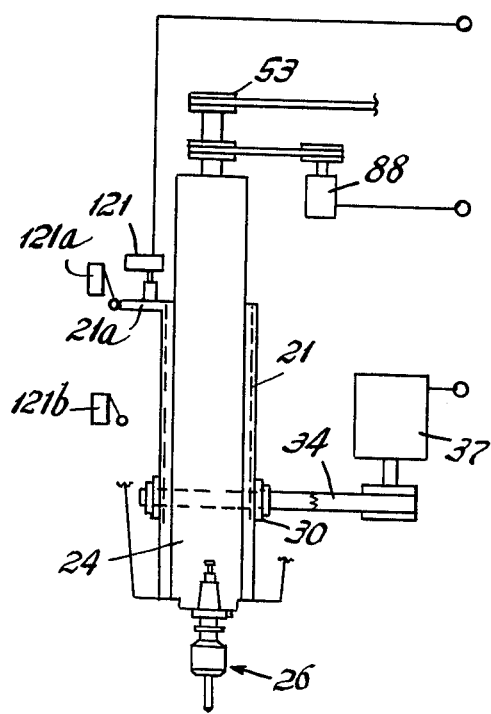

MACHINE TOOLS

This is a division of application Ser. No. 501,865, filed Aug. 30, 1974.

The herein disclosed spindle and drawbar mechanism is disclosed and claimed in out application Ser. No. 562,632, filed Mar. 27, 1975.

This invention relates to machine tools and more particularly to a spindle unit for use in such machines and means for automatically transporting a toolholder and tool to and from the spindle.

Heretofore, it was known to provide a spindle unit for machine tools in which the tool holding end of the spindle has a tapered socket in its nose to receive and hold a toolholder provided with an adapter, and to engage the adapter with finger hooks carried by the drawbar so that when the finger hooks are engaged and the drawbar is pulled inwardly by powerful spring means the toolholder will be solidly seated in the socket. To release the toolholder for removal from the spindle, it was necessary to reverse the operations and push the drawbar inwardly a substantial distance against the force of said spring and this required considerable power.

This expenditure of power is avoided by the present invention by moving the drawbar only enough to relieve the pressure between the finger hooks and the adapter, and by providing additional means for withdrawing the finger hooks to positions clear of the adapter so that the toolholder may be removed from the spindle. The finger hook-retracting means according to the present invention includes means for locking the finger hooks in adapter-engaging position and means for unlocking the hooks when the toolholder is to be removed from the spindle.

There is a further advantage obtained by the present invention and that is because the finger hooks are mechanically locked in adapter-engaging position by means movable independently of the drawbar.

In the embodiment of the invention disclosed herein the pressure is removed from between the surfaces of the hooks and the cooperating surface on the toolholder adapter by pneumatic means which moves the drawbar slightly, that is, only enough to take the pressure off the contacting surfaces. When this has happened, additional pneumatic operated means are operated to unlock the hooks and spread them so as to be clear of the cooperating surface on the adapter and, therefore, leave the toolholder free to be removed from the spindle. Preferably, the finger hook-retracting and locking means also engages the top surface of the toolholder to strike it with a hammer blow sufficiently to break any adhesion existing between the steep tapered surface of the toolholder and that of the spindle.

To drive the tool positively by the spindle, it was known heretofore to provide cooperating driving elements on both the end of the spindle and the adjacent portion of the toolholder. When these elements have close fit one relative to the other, means have been provided for orienting the toolholder relative to the spindle.

For this purpose there is provided by the present invention a resolver which is connected to a sleeve rotatably connected to the spindle and which in a known manner causes rotation of the spindle to be stopped, when returning to tool-changing position, in a determinate angular orientation in the spindle housing, in which position the cooperating driving elements are aligned with each other for free sliding engagement.

Another feature of this invention is the provision of means for relieving the quill and the quill nut of the excessive force which would be applied to the spindle when the drawbar is moved to relieve the pressure of the finger hooks from the adapter preparatory to the withdrawal of the hooks from the adapter.

A further feature is the provision of means for applying a hammer blow to the push rod to cause the end of the latter to strike the top of the adapter and dislodge the toolholder from the spindle nose.

Another feature of this invention is the provision of improved pneumatically operated gear shift means and automatically operated means for locking the gear shift means in the selected setting against accidental movement.

Other features and advantages will hereinafter appear.

To avoid the repetitious qualification of several of the elements of this apparatus and parts thereof as used herein:

the word "simultaneously" is intended to mean "in the same part of a cycle of operations" and not necessarily instantaneously; and the word "toolholder" is intended to include the work performing tool and the means to fit the tool to the spindle, unless the context refers to the construction of the means per se for holding a tool.

In the accompanying drawings:

FIG. 2a is a view of the upper limit switch and the quill plate by which it is operated.

FIG. 8 is a vertical section of the finger-carrying portion of the drawbar, a portion of the toolholder and a portion of the push rod and the means thereon for locking the finger hooks engaging the adapter of the toolholder.

FIG. 9 is a dissected vertical section on an enlarged scale of the upper and lower portions of the spindle unit showing the drawbar advanced slightly to relieve the pressure of the hooks on the adapter.

FIG. 10 is a horizontal section taken on the line 10—10 of FIG. 8 showing the lower end of the push rod and the finger hooks of the drawbar in section.

FIG. 11 is an elevation, partly in section, of the body of the finger hook locking ring.

FIG. 12 is a view similar to FIG. 8 but showing the finger hooks on the end of the drawbar fingers disengaged from the adapter on the toolholder, as in FIG. 9, but with the locking ring disengaged from the ends of the finger hooks.

FIG. 13 is a dissected view similar to FIG. 9 but showing the drawbar finger hooks unlocked and the finger hooks expanded to a position clear of the head of the adapter.

FIG. 14 is a vertical section of the top portion of the spindle unit showing in section the diaphragm means for operating the drawbar and the means for operating the push rod which operates the hook-releasing means.

FIG. 14a is a plan view of the top surface of the large diaphragm showing the means for holding the push rod pin up until the secondary diaphragm operates.

FIG. 14b shows on a large scale the means for holding the push rod pin up until the secondary diaphragm operates.

FIG. 15 is a side elevation showing means for controlling the operation of and the locking of the gear shift means in any one of three positions, i.e., high speed driving position, low speed driving position and neutral non-driving position.

FIG. 16 is a sectional view taken on the line 16—16 of FIG. 15.

FIG. 19 is a diagram showing the electrical and pneumatic components relating to the drawbar and push rod operating mechanism.

FIG. 20 is a diagrammatic view showing the relation between the limit switches, the spindle driving motor and the stepping motor for the quill.

GENERAL CONSTRUCTION OF SPINDLE UNIT

Figure 1:
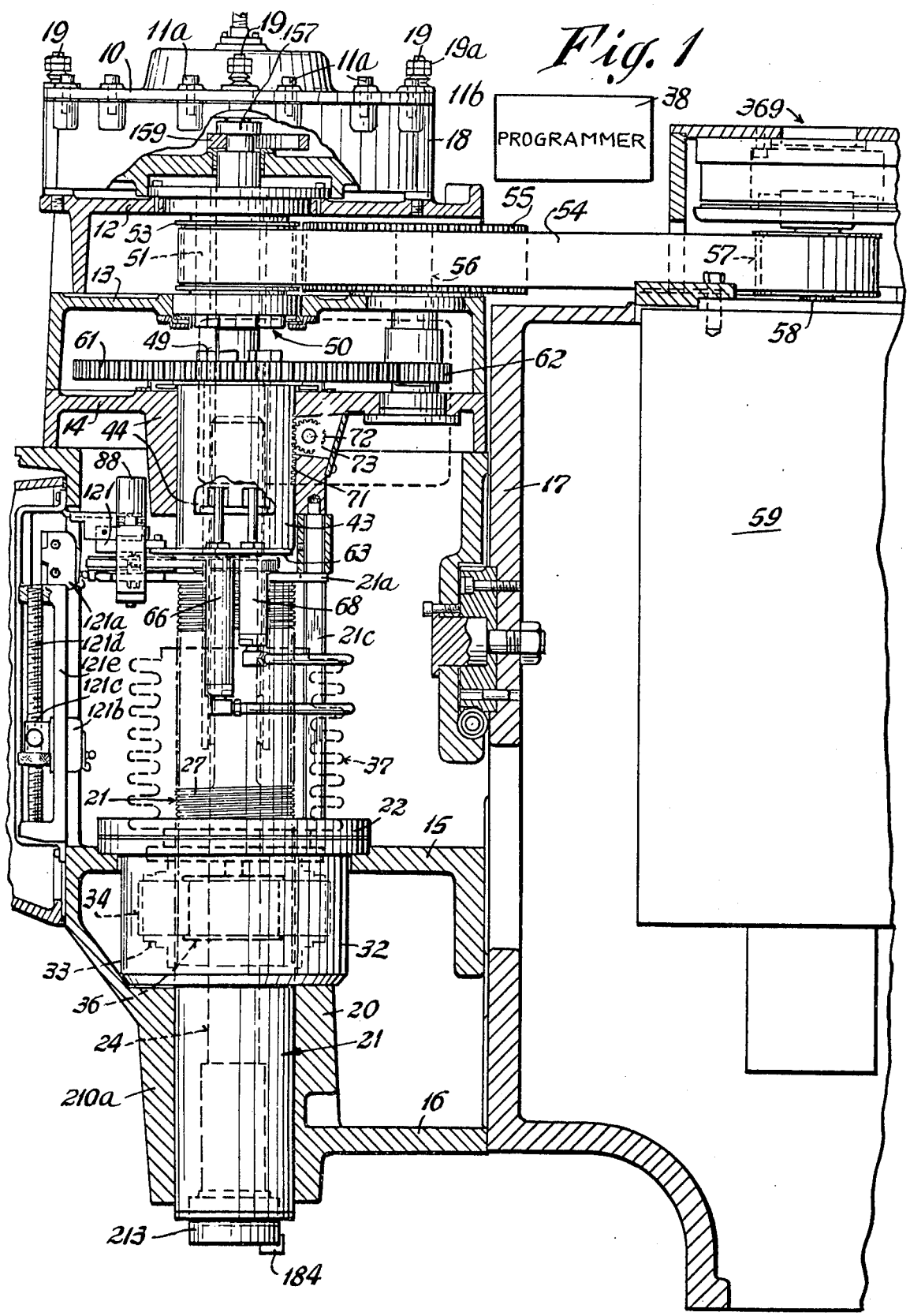
FIG. 1 is a vertical section through the framework of the spindle unit of the present invention showing the spindle and the operating mechanism therefor in elevation, the spindle being shown at the top of its stroke with the back gear in engagement with the driving gear.

As illustrated in FIG. 1, the spindle unit of the present invention comprises a frame having a top plate 10 and a lower plate 11 secured together by screws 11a and forming a dome 11b. The frame comprises a plurality of stacked units having horizontal supports 12, 13, 14, 15 and 16 on which various elements of the machine are mounted and a main vertical support 17. The dome 11b has an integral upstanding peripheral flange 18 through which extend screws 19 which are threaded into the top plate 12 and have at their upper end spring 19b and nuts 19a to resiliently hold the dome on the support 11 for a purpose referred to below.

Figure 3:
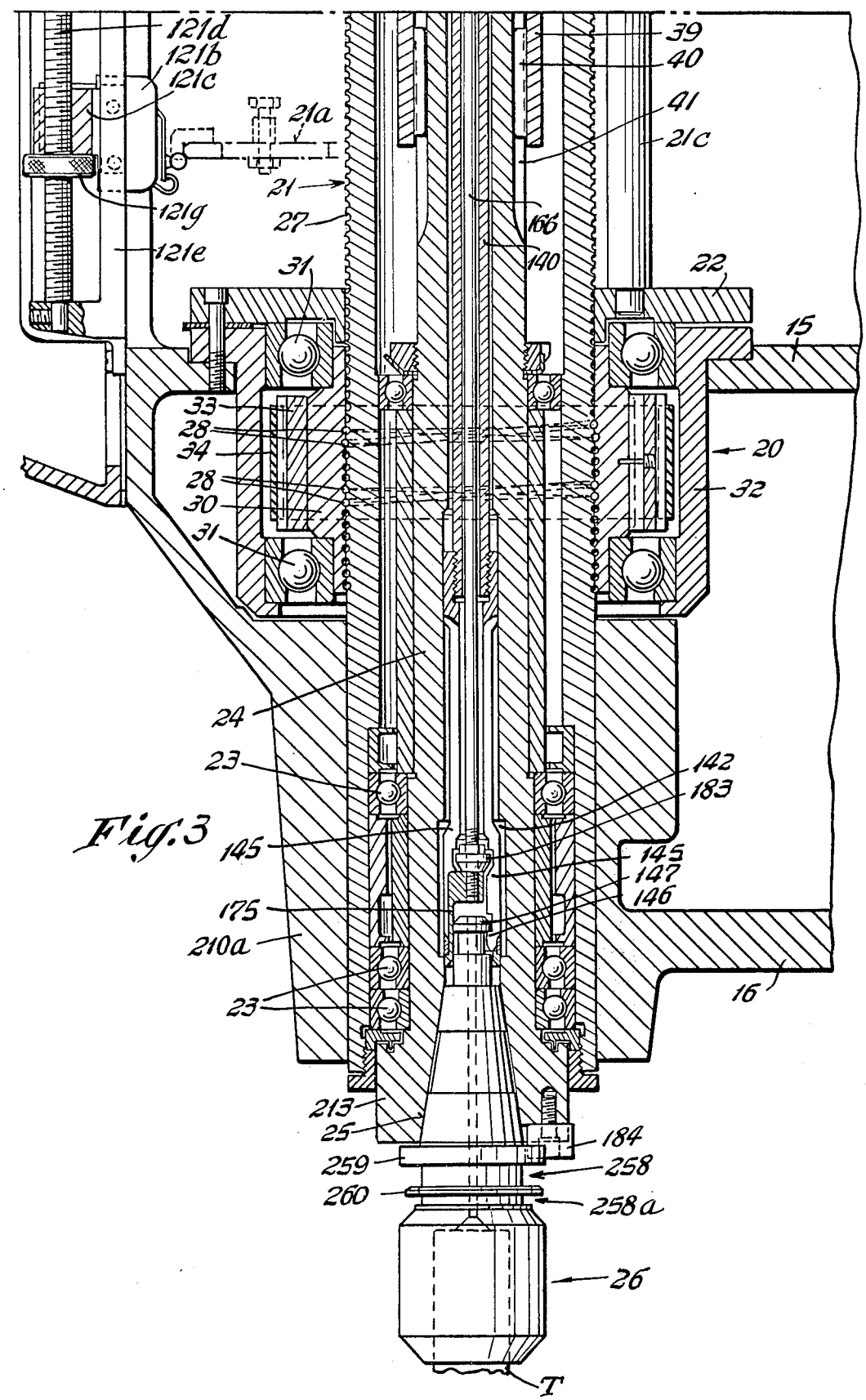
FIG. 3 is similar to FIG. 2 but shows the lower portion of the spindle unit.

Mounted in a bearing 20 formed integral with supports 15 and 16, see FIG. 3, is a quill 21 which extends upwardly and passes through an aperture in a plate 22 which, with the bearing 20, guides the quill in its vertical movements. Secured to the upper end of the quill 21 is a transversely extending plate 21a having a slot 21b which engages a vertical rod 21c mounted in the support 14 and plate 22 which prevents the plate 21a from rotating but allows it to move vertically.

The quill 21 is tubular and mounted within it for rotation on ball bearings 23 is a spindle 24 having on its nose a tapered socket 25 to releasably receive a tapered toolholder 26 and hold it and the tool T in working position. The bearings 23 for the spindle 24 are so placed that while the spindle 24 may rotate in the quill 21 it will move axially with the quill to carry a tool to and from the work.

To advance and retract the spindle 24, the quill 21 is provided with a helical groove 27 adapted to receive balls 28 carried in a similar groove 29 in a ball-nut 30 rotatably mounted on bearings 31 carried by a housing 32 secured to the support 15, see FIG. 3. The outer portion of the nut 30 constitutes a pulley 33 which is engaged by a non-slip belt 34 driven by a pulley 36 on a stepping motor 37, see FIGS. 1 and 6, so that when the motor 37 rotates in one direction the quill 21 will advance the tool T toward the work, and when the motor 37 rotates in the opposite direction the tool T will be retracted from the work. The extent of movement of the quill 21 and hence the tool T may be controlled for each tool by an operator or by programming means 38 in conjunction with upper and lower limit switches referred to below.

SPINDLE DRIVE

Figure 4:
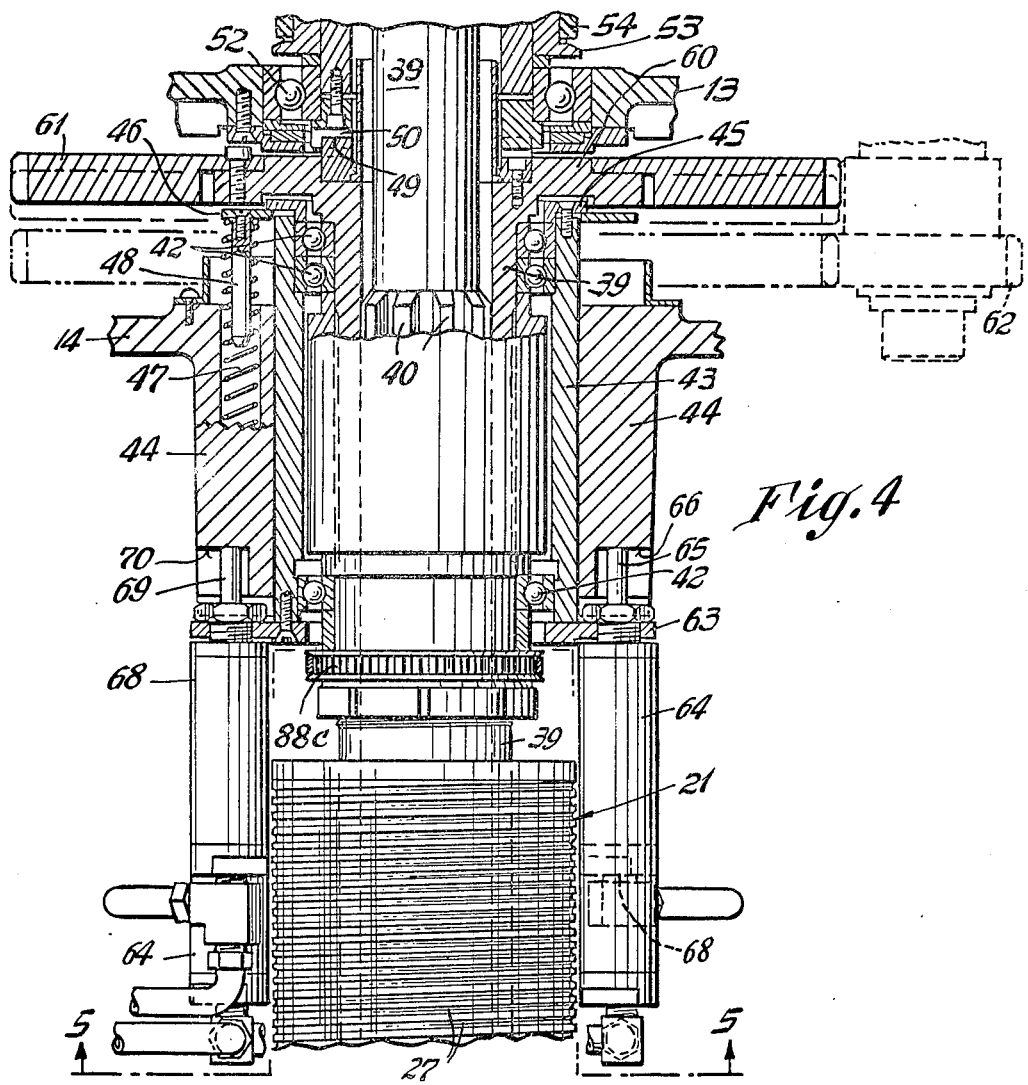
FIG. 4 is a vertical section showing the drive mechanism for rotating the spindle, the driving sleeve and the back gear being shown in full lines in high speed driving position.

To rotate the spindle 24 and thus the toolholder 26 and tool T therein, there is provided a driving sleeve 39 which surrounds the spindle 24 and has a plurality of ribs 40 slidably engaging the sides of elongate grooves 41 in the external surface of the spindle 24, see FIGS. 3 and 4, permitting the driving sleeve 39 and the spindle 24 to move vertically independently of each other while still rotating together.

The driving sleeve 39 is mounted in ball bearings 42 carried by a gear shift sleeve 43 slidably mounted for vertical movement in a bearing 44 carried by the support 14. The upper end of the gear shift sleeve 43 has a flange 45, see FIGS. 2 and 4, positioned to be engaged by a ring 46 which is engaged by a plurality of springs 47 located in cavities in the bearing 44. Pins 48 within the springs 47 guide their expanding and contracting movements.

Under the force of the springs 47, the gear shift sleeve 43 is normally urged upwardly to cause teeth 49 carried by the driving sleeve 39 to engage teeth 50, shown in FIGS. 1, 4 and 20, carried by a sleeve 51 which is rotatably mounted on bearings 52 in the supports 12 and 13.

Figure 2:
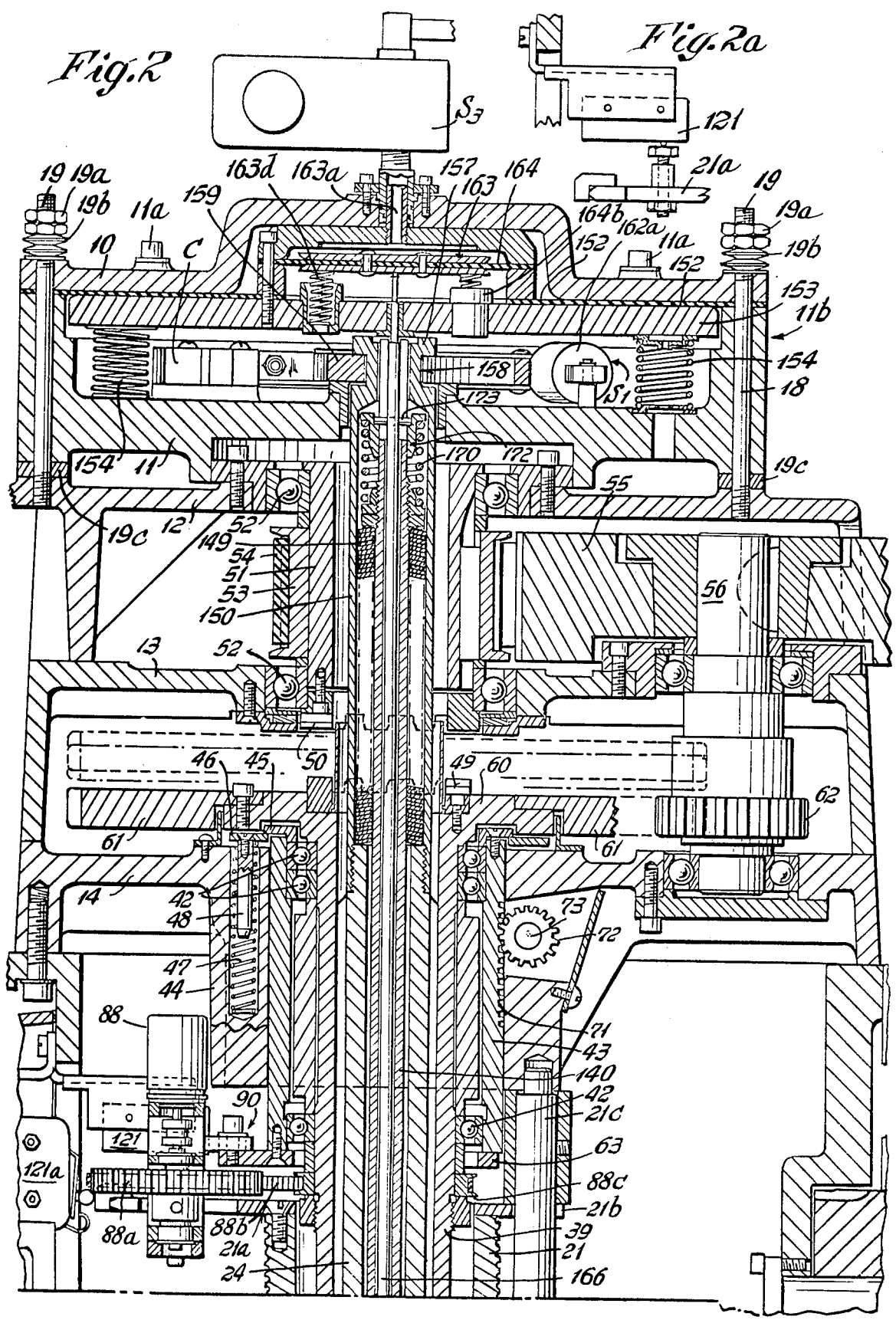
FIG. 2 is a vertical section through the upper portion of the spindle and its operating mechanism.
Figure 6:
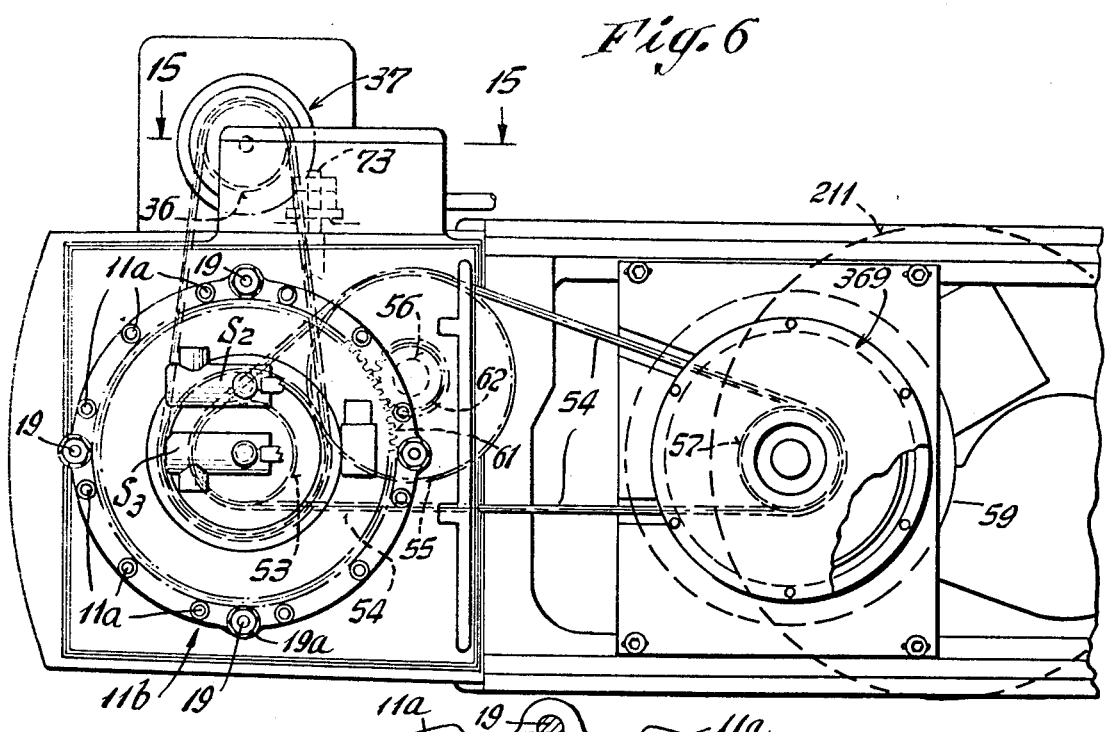
FIG. 6 is a top plan view of the spindle unit of the present invention showing the spindle drive and the quill drive and motors for operating the drives.

Secured to the sleeve 51 is a pulley 53 which is driven by a non-slip belt 54, see FIGS. 1, 2 and 6, extending over a pulley 55 mounted on a shaft 56 to a pulley 57 mounted on a shaft 58 of a variable speed spindle rotating D.C. motor 59. When the motor 59 is energized, the driving sleeve 39 and the spindle 24 will be rotated in the same direction as the motor, and at the same speed, in the embodiment of the invention shown herein wherein the pulleys 53 and 57 have the same diameter.

To increase the torque applied to the spindle 24, the relative speed of rotation of the spindle 24 is reduced under the control of the programming means 38 as explained below, the driving sleeve 39 having a flange 60 to which is secured a back gear 61 positioned to engage a driving gear 62 secured to the shaft 56 to which the pulley 55 is secured to be driven thereby. If the same direction of rotation of the spindle is to be maintained, when the speed of the spindle is thus changed, the direction of rotation of the motor 59 is also changed as will appear more fully below.

GEAR SHIFTING

Figure 5:
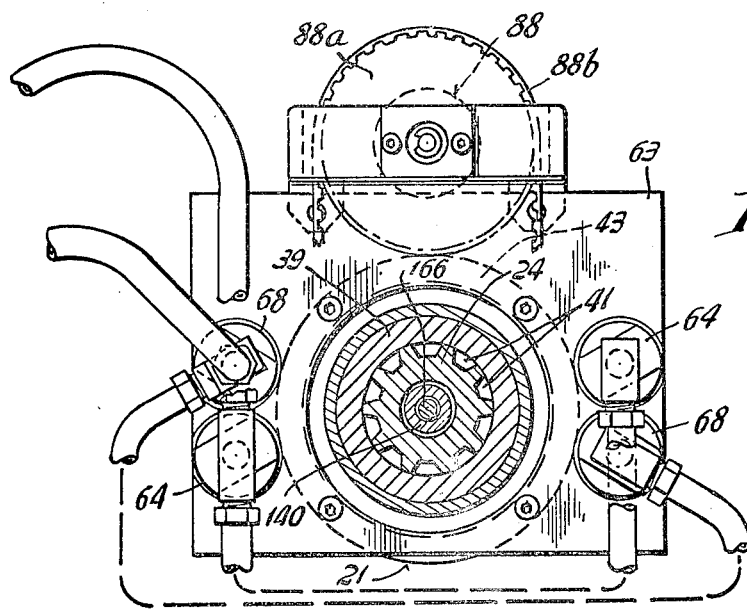
FIG. 5 is a horizontal section taken on the line 5—5 of FIG. 4 showing the resolver rotor and drive thereon and the air cylinders for operating the gear shift means for the spindle.

For the purpose of moving the gear shift sleeve 43 to low speed position, there is attached to the lower end of the sleeve 43 a plate 63, see FIG. 4, carrying a pair of air cylinders 64, see FIG. 5, the piston rods 65 of which are positioned in abutting relation against shoulders 66 on the bottom of the bearing 44. The cylinders 64 have such lengths that, when pressurized, their movement will be sufficient to force the gear shift sleeve 43 downwardly against the pressure of the springs 47 from high gear drive position to low gear drive position shown in full lines in FIG. 2 in which the small driving gear 62 engages the large back gear 61.

In order to disconnect the spindle 24 from the motor 59 for reasons pointed out below, there is provided means including another pair of air cylinders 68 also carried by the plate 63 and having their piston rods 69 abutting shoulders 70 on the bottom portions of the bearing 44. The cylinders 68 have such lengths that when pressurized, the movement of the cylinders will be sufficient to force the gear shift sleeve 43 downwardly against the pressure of springs 47 from high gear drive position to neutral position in which the back gear 61 does not engage the driving gear 62 and the teeth 49 and 50 are disengaged. This feature of being able to disconnect the spindle from the motor drive is advantageous when setting up or adjusting the positions of the parts of the spindle. Suitable valve mechanism is provided for controlling the cylinders 64 and 68 manually or automatically as will be pointed out in connection with the description of the system shown in FIG. 21.

The pairs of cylinders 64 and 68 are respectively located diametrically opposite each other, as shown in FIG. 5, to balance the force of moving the gear shift sleeve 43.

Figure 21:
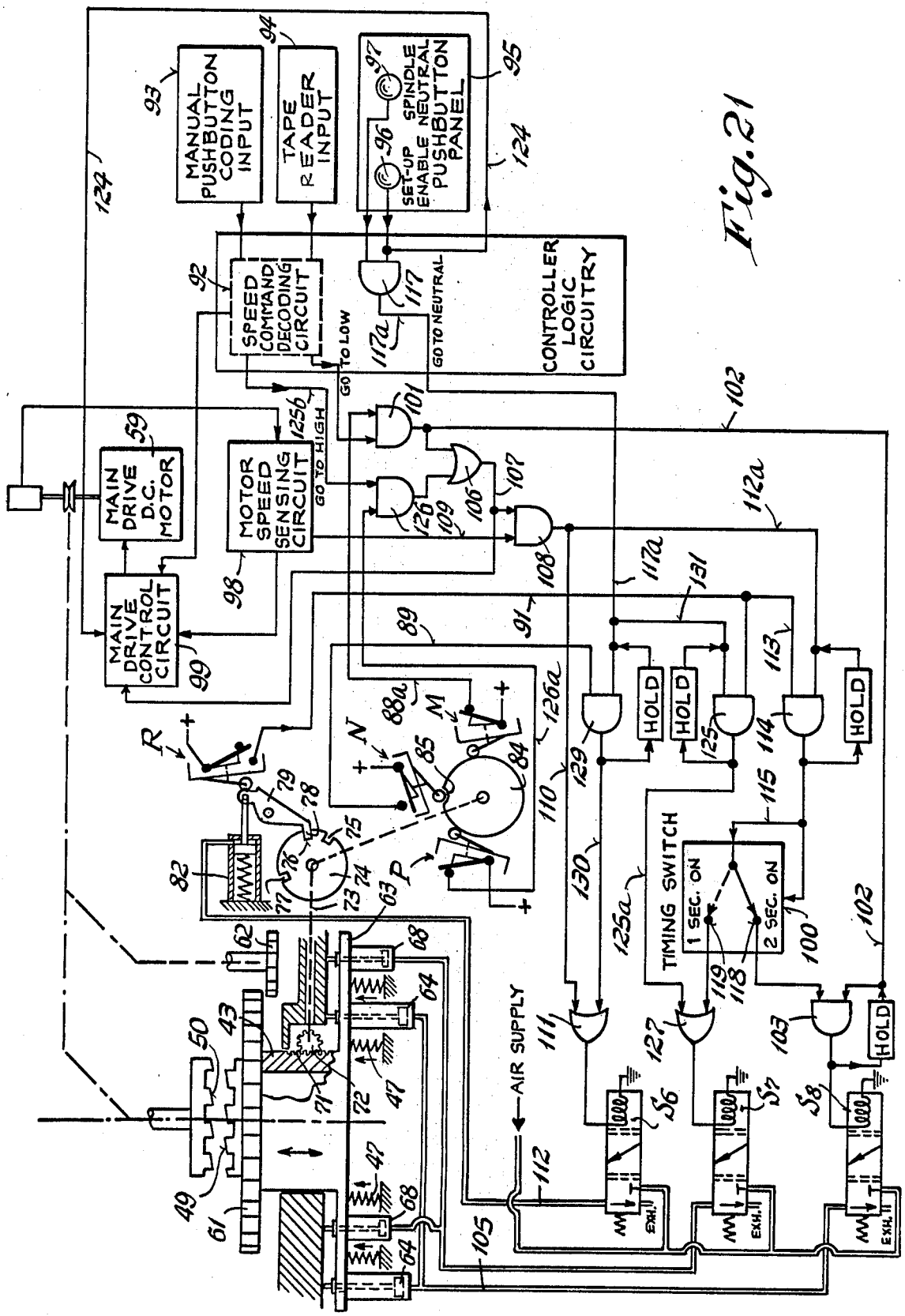
FIG. 21 is a diagram showing the electrical and pneumatic components relative to the spindle driving motor, the gear shift controls and the gear shift mechanism.

The three positions of the gear shift sleeve 43 are controlled automatically by means shown in FIGS. 2, 15, 16 and 21 in which the gear shift sleeve 43 is provided with a gear rack 71 meshing with a gear 72 secured to a shaft 73 having secured to it a locking disk 74 as shown in FIGS. 15 and 16. The locking disk 74 is provided with radial slots 75, 76 and 77 spaced around its periphery to receive a tooth 78 on a locking pawl 79 pivoted at 80 and pivotally connected to a piston rod 81 of an air cylinder 82 which is controlled by a solenoid valve 83 as shown in FIGS. 15, 16 and 21.

When the gear shift sleeve 43 is in neutral position, the tooth 78 on pawl 79 will engage the slot 76 in the locking disk 74 to lock the shaft 73 against rotation and hence the gear shift sleeve 43 against movement. When the sleeve 43 is in high gear drive position, the locking pawl tooth 78 will engage the slot 75 and when in low gear drive position the locking pawl tooth 78 will engage the slot 77, the locking pawl 79 being moved by the piston rod 81 of the cylinder 82 to cause the tooth 78 to disengage the disk 74 while the sleeve 43 is being moved by the cylinders 64 or 68, or by the springs 47 as pointed out below with reference to FIG. 21.

To coordinate the shifting of the gear shift sleeve 43 with other operations of the spindle unit as described below, a cam disk 84 secured to the shaft 73 is provided with a notch 85 to receive rollers on switches P, N and M, each of which is biased to move to open circuit position when its roller moves into the notch 85 in the cam disk 84. These switches P, N and M are wired so that they denote respectively that the sleeve 43 is not in high gear, not in neutral and not in low gear.

When the gear shift sleeve 43 is in neutral position, the roller on the switch N will enter the notch 85 in the cam 84, as shown in FIG. 21, and allow the switch N to open a control circuit including a lead 89 shown in FIG. 21, but when the cam 84 moves either to the left or the right (which occurs when the sleeve 43 is moving to either high or low gear position) the switch N is closed giving a signal to the control circuit that the sleeve 43 is not in neutral position as will be more fully explained in connection with the discussion of FIG. 21.

To sense the position of the locking pawl 79 for the purpose of determining whether or not the control shaft 73 is locked or free, there is provided a switch R, see FIGS. 15 and 21, which is released by piston rod 81 when the pawl 79 is in unlocking position and closes to energize a control circuit 91, referred to below.

SPINDLE GEAR SHIFT OPERATION

FIG. 21 which is a combination mechanical, electrical, pneumatic and control logic diagram shows the back gear 61, the clutch comprising the teeth 49 and 50, the driving gear 62, the gear shift sleeve 43, plate 63, cylinders 64 and 68 for moving the sleeve 43, and hence the back gear 61, from high gear position shown in FIG. 4 in full lines to which it is urged by springs 47, to low gear position and neutral position respectively. Also shown diagrammatically are the gear rack 71 on the gear shift sleeve 43, gear 72, shaft 73, locking disk 74 and cam 84, pawl 79 and pawl-operated switch M.

In addition to the above-named elements, the circuits shown in FIG. 21 include a speed command decoding circuit 92, a manual push button unit 93, a tape reader input 94, a push button panel 95 having a set-up enable push button 96, spindle neutral push button 97, a motor speed sensing circuit 98, a main drive control circuit 99, a timing switch 100 and leads connecting the various elements referred to below.

The sequence of gear shifting to either high or low gear may be initiated by manually inputting a speed code that requires a gear shift, or by tape command.

SHIFT-TO-LOW GEAR SEQUENCE

Assuming that the back gear is in high gear or neutral position and a go-to-low signal is given, the signal is produced by the tape reader input 94 through the motor speed command decoding circuit 92 which causes the speed of the spindle motor 59 to be reduced to 30 r.p.m. and to continue to operate at that speed during the gear shifting operation. The signal is sent through AND gate 101, lead 102 and AND gate 103 which activates solenoid valve S8 which through conduit 105 causes operation of the cylinders 64 which moves the gear shift sleeve 43 downwardly to cause the back gear 61 to mesh with the driving gear 62.

However, before this happens the AND gate 101 must be made conductive by a signal from switch M through lead 88a, that the back gear 61 is not in low gear position. Also, it is necessary that the AND gate 103 be made conductive. This is accomplished by a signal passed from the AND gate 101 to OR gate 106, lead 107 and AND gate 108 which is made conductive by a signal through lead 109 from the motor speed sensing circuit 98 which indicates that the speed of the motor has been reduced to about 30 r.p.m. The output of the AND gate 108 is passed via lead 110 to OR gate 111 which activates solenoid valve S6 and causes air under pressure to flow through the duct 112 to the cylinder 82 which then releases the pawl 79 from the locking disk 74 and frees the gear shift sleeve 43 for movement.

When pawl 79 is released, switch R is allowed to close and this sends a signal via lead 91, lead 113 to AND gate 114 which is made conductive by a signal via lead 112a from AND gate 108 which in turn had been made conductive as stated above. When thus made conductive a signal passes from AND gate 114 via lead 115 to switch blade 116 of the time switch 100. The blade 116 moves between two contacts 118 and 119.

When contact 118 is engaged by the switch blade 116, the AND gate 103 becomes conductive and activates solenoid S8 which feeds air under pressure to cylinders 64 which moves the back gear 61 to low speed position. If, when the cylinders 64 are activated and the teeth on the back gear 61 and the teeth of the driving gear 62 properly engage, the notch 85 on the disk 84 will permit the switch M to open the not-in-low signal, thus rendering the AND gate 101 not conductive which will result in the solenoid valves S6 and S8 being deactivated allowing the pawl 79 to enter the slot 77 and lock the gear shift sleeve 43 in low speed position.

Should the teeth of the back gear 61 and the driving gear 62 be out of alignment and not fully engaged after approximately two seconds, the switch blade 116 will move to disengage the contact 118. This will result in the deenergizing of the low solenoid valve S8 and the subsequent removal of air pressure and the exhausting of air from cylinders 64. At the same time switch blade 116 will engage the contact 119. This will result in the energizing of the neutral solenoid valve S7 and cylinders 68 thereby causing the teeth of the back gear 61 and driving gear 62 to separate and assume a different relative tooth alignment due to the continued slow rotation of the motor 59. After the gears have been disengaged for one second, the switch blade 116 is shifted back to the contact 118 and the solenoid valve S8 and the cylinders 64 make another attempt to cause the teeth 61 and 62 to engage.

This engagement and disengagement cycle is repeated every three seconds, as described above, while the back gear 61 is rotating slowly until the teeth of the gears mesh and this is indicated by the actuation of the switch M which, as above stated, signals the end of the gear shift cycle.

SHIFT-TO-HIGH GEAR SEQUENCE

Since the gear shift sleeve 43 is normally urged to high gear position in which the teeth 49 and 50 are caused to be engaged by springs 47, it is merely necessary to operate the cylinder 82 to release the latch 79 from the locking disk 74 and allow the springs 47 to raise the back gear 61 to high gear position.

To release the latch 79 the Go-To-High lead 125b passes a signal to AND gate 126 which is made conductive by the switch P which is closed when the gear shift sleeve 43 is not in high gear position. When conductive the AND gate 126 sends a signal to OR gate 106 and lead 107 to AND gate 108. The latter gate 108 is made conductive by the lead 109 from the motor speed circuit 98 and when conductive a signal is passed by AND gate 108 through lead 110 or OR gate 111 and solenoid valve S6 which feeds air under pressure to the cylinder 82 which releases the latch 79 and allows the sleeve 43 to move the back gear to high gear position.

At the same time that a signal is sent from AND gate 108 to OR gate 111 to release the latch 79, a signal is sent by AND gate 108 via leads 112a and gate 114 to the time switch 100. Gate 114 is rendered conductive by a signal via lead 91 when the switch R is closed by the release of the latch pawl 79.

Should the teeth 49 and 50 be out of alignment and not fully engaged after approximately two seconds, a neutral solenoid valve S7 will be energized as a result of the timer switch 100 when its switch blade 116 moves to contact 119. This will result in the pressurizing of cylinders 68 thereby allowing the teeth 49 and 50 to separate and assume a different relative tooth alignment as the teeth continue to rotate slowly. This disengagement takes place for about one second, then the neutral gear solenoid valve S8 is deenergized once again allowing the teeth of the clutch to mesh.

This engagement and disengagement cycle is repeated every three seconds, as described above, until the teeth 49 and 50 engage which is indicated by the opening of the not-in-high gear signal from switch P. When this occurs, the pawl operating cylinder 82 is deenergized, thereby allowing the pawl 79 to fall into the slot 75 of the locking disk 84 so that the gear shift sleeve 43 is locked in high gear position. At this time, the pawl-operated switch R will be moved to open circuit position, thereby signaling the end of the gear shifting cycle.

SHIFT-TO-NEUTRAL GEAR SEQUENCE

Assuming that the back gear 61 is in low gear or high gear position and a GO-TO-NEUTRAL signal is given; this signal is produced by first pressing the "Set-up Enable" push button 96 and then pressing the Spindle Neutral push button 97 on the control panel 95. In this case the spindle drive motor 59 is stopped by operation of the push button 96 which opens the circuit including lead 124 to the Main Drive Control Circuit 99 to stop the motor 59. The actuation of the push button 97 results in sending a signal via AND gate 117, lead 117a to AND gate 129, made conductive by lead 89 from the not-in-neutral switch N, and lead 130 to OR gate 111 which activates solenoid valve S6 to operate cylinder 82 to cause the latch 79 to release the locking disk 74 and thus the gear shift sleeve 43 for movement. At the same time via lead 131, which is connected to lead 117a, AND gate 125, lead 125a and OR gate 127 energize solenoid valve S7 which allows air under pressure to flow to the cylinders 68 which limits the upward movement of the gear shift sleeve 43 under the influence of the springs 47, if the back gear 61 had been in low gear position, or returns the back gear to neutral position if the back gear had been in high gear position. When the back gear is in neutral position, the "in neutral" switch N is moved to open position. This causes the AND gate 129 to be non-conducting, causing the deenergization of the release gear latch solenoid valve S6 thereby allowing the latch 79 to fall into slot 76 of the locking disk 74 to lock the gear shift sleeve in neutral. When the latch is in place, the latch switch R will be opened. This will result in the deenergization of the neutral gear solenoid S7 and will also signal the end of the gear shifting cycle.

DRAWBAR

Heretofore, it has been suggested that a tapered toolholder be drawn into tight engagement with a tapered socket of a spindle by hooks on the end of a drawbar engaging an adapter on the toolholder and that there be camming means operative as a result of the movement of the drawbar relative to the spindle for moving said hooks to a position clear of the adapter and allow the toolholder to be removed from the spindle socket. This required an adapter of special construction and also required the drawbar to have an excessively long stroke. Thus the maximum force capability of the retracting spring was limited and a smaller portion of that force was available for the primary function of the drawbar, holding the tapered toolholder in the tapered socket.

These disadvantages have been obviated by the present invention by providing for withdrawing the adapter hooks from the adapter independently of the pulling force of the drawbar, so that it is merely necessary to move the drawbar slightly, to take the pressure of the hooks off the adapter, and then move the hooks away from the adapter by separate means, the operation of which requires comparatively little power.

In the form of this invention herein disclosed, within the spindle 24 there is a drawbar 140, the lower enlarged end 141 of which fits in a cavity 142 in the lower end portion of the spindle 24 into which the toolholder 26 having an adapter 143 extends when the toolholder 26 is seated in the tapered socket 25. The lower end 141 of the drawbar 140 has elongate slots 144, see FIG. 10, forming fingers 145, each having a notch forming a hook 146 positioned to receive and externally engage the head 147 of the adapter 143 secured to the top of the tapered toolholder 26 when the latter is inserted in the tapered socket 25 at the end of the spindle.

The fingers 145 are resilient and are biased to move inwardly so that fingers hooks 146 extend into an annular groove 146a in the adapter forming an annular shoulder 148 on the adapter to be engaged by finger hooks 146 on the fngers 145, as shown in FIG. 3. After a toolholder 26 has been placed in the socket 25, control apparatus referred to below is actuated to cause the drawbar 140 to be pulled inwardly of the spindle and this movement seats the toolholder snugly in the nose of the spindle.

For this purpose, there is provided a powerful drawbar spring 149 which may comprise a stack of Belleville disks which are carried within an extension sleeve 150 of the spindle 24 and surround the drawbar 140. One end of the spring 149 engages the upper end 151 of the spindle proper, while the other end engages a nut 151a threaded on the drawbar 140 and establishes a powerful upward thrust of the drawbar.

As stated above, it has been proposed to lock the drawbar hooks in engagement with a toolholder adapter as an incident to the movement of the drawbar in one direction, and to unlock and withdraw the drawbar hooks by a movement of the drawbar in the opposite direction. However, to so control the drawbar hooks required a substantial movement of the drawbar against the force of the powerful drawbar spring to overcome the pressure, and friction produced thereby, of the hooks on the adapter, and a further movement of the drawbar to move the hooks clear of the shoulder 148 on the adapter.

This required a large movement of the drawbar to first release the grip of the hooks on the adapter and then with additional displacement to disengage them by a camming action, thereby allowing the toolholder to be removed from the spindle. Fundamental to the design of the quill type vertical milling machine is the fact that the space available for the drawbar springs is limited both in length and diameter. This limits the amount of spring material and the energy which may be stored in these springs when stressed to the greatest possible level. The energy stored in a typical spring stack is proportional to the displacement from free height multiplied by the maximum force level. Thus where the amount of spring material is limited by space requirements the shorter the stroke required of the spring stack the greater the maximum force level available from it.

In the present invention the maximum drawbar pull is made available to retain the toolholder in the spindle taper by providing for withdrawing the finger hooks 146 from the adapter 143 independently of the pulling force of the drawbar 140, so that it is only necessary to move the drawbar slightly, to take the pressure of the finger hooks 146 off the adapter 143, and then move the finger hooks 146 away from the adapter by separate means, the operation of which requires comparatively little power.

According to the present invention the power for moving the drawbar 140 against the force of the drawbar spring 149 is derived from air under pressure passing through solenoid valve S2 acting on a primary diaphragm 152 which has a diaphragm plate 153 supported on weight-counterbalancing springs 154. The diaphragm plate 153 is preferably concentric with and directly above the upper end 155 of the drawbar 140 and has a flanged bushing 156 which, when the diaphragm 152 is depressed applies force to the upper end of the drawbar 140 to move the latter downwardly against the force of the heavy spring 54 until bushing 156 bottoms on the upper end of the spindle 157. Drawbar 140 is moved just far enough to move the finger hooks 146 away from the annular shoulder 148 of the adapter and thus relieve the pressure of the finger hooks on the adapter, see FIGS. 2, 9, 12 and 13.

To avoid the pressure on the drawbar 140 loading the spindle bearings and causing the spindle 24 to move downwardly and not produce the desired relative movement between the drawbar 140 and spindle, the upper end 157 of the spindle, which projects above the support 11, is provided with an annular groove 158, and there is a spindle-restraining ground plane plate, herein referred to as locking plate 159, which is pivotally mounted on the horizontal support 11 of the framework and has an arcuate slot 160, the edges of which engage the shoulder of the groove 158 when the locking plate 159 is swung into the spindle groove 158 and thereby holds the spindle 24 against downward movement. A circular hole 161 (see FIG. 7) in the locking plate 159 is large enough to permit the upper end 157 of the spindle 24 to pass through the plate 159 when the spindle is advanced from and returned to the upper limit of its movement.

The locking plate 159 is operated by a cylinder and piston S1, see FIGS. 7 and 19, under the control of tool ejection means described below. The extent of downward movement of the locking plate 159 and the spindle 24 is controlled by a bushing 153a in the support 11 which is precision formed to accurately locate the locking plate 159 and hence the spindle relative to the related parts in the spindle unit.

When the primary diaphragm plate 153 is activated by air under pressure passing through solenoid valve S2, the drawbar 140 will be depressed a slight amount which, according to the present invention, need be only sufficient (in the order of 0.100 inches and obviously is exaggerated in FIG. 9) to relieve the pressure of the finger hooks 146 from the head 147 of the adapter 143 as shown in FIG. 12.

After this occurs, a secondary diaphragm plate 163, carried by a secondary diaphragm 164 which is secured to and carried by the diaphragm plate 153, is activated by air under pressure passing through solenoid valve S3 and tube 163a to move downwardly causing a pin 165 (see FIGS. 5 and 9), slidably mounted in the flanged bushing 156 in the diaphragm plate 153, to engage and depress a push rod 166 which extends through the drawbar 140 and into a cavity 167 at the lower end of the drawbar 140.

The lower end 168 of the push rod 166 carries a finger locking and releasing head 169 shown in FIGS. 10 and 11 for locking and releasing the adapter gripping finger hooks 145.

The pin 165 actuates the push rod 166 against the force of a relatively light coil spring 170 which engages a lock nut 171 on the drawbar 140 and the other end lies in a cup 172 which is slidably mounted on the drawbar and has operative engagement with a cross pin 173 mounted in the push rod 166. The drawbar has a transverse slot 174 permitting the necessary longitudinal movement of the cross pin 173 relative to the drawbar.

The locking and releasing head 169 on the push rod 166 has four depending bars 175, see FIGS. 10 and 11, located in the slots 144 between drawbar fingers 145. At their lower ends the bars 175 are connected to a ring 176. Extending upwardly from the ring 176 is a locking ring 177 having inclined surfaces 178 to engage inclined surfaces 179 and lock the fingers 145, as shown in FIGS. 3 and 8, against being moved away from and releasing the adapter 143, in which position the spindle is prepared for operations.

In addition to the head 169 which carries the locking ring 177, the push rod 166 has a cam 180 which lies in a space between the fingers 145 and has a downwardly tapering surface 180:, positioned when the push rod is in depressed position, to be engaged by cam surfaces 181 on the fingers 145 so as to push the fingers outwardly when the drawbar returns to the position shown in FIG. 13 in which the hooks 146 are clear of the shoulder 148 on the adapter. The cam 180 has a concentric portion 183 which holds the fingers spread apart until the push rod is retracted as shown in FIG. 13.

In order to avoid the tapered end of the toolholder from clinging to the tapered socket of the spindle when the adapter is released by the finger hooks, the stroke of the push rod 166 is such that a portion of the head 169 of the push rod or the end of the push rod will strike the end of the head 147 of the adapter 143 and loosen the toolholder so that it will fall out of the spindle socket.

TOOL CHANGING

The operation of changing tools on the spindle whether under manual or automatic control requires that the spindle 24 be in fully retracted position and this is determined by the upper limit switch 121 positioned to be actuated by means of a plate 122 carried by the quill 21. The switch 121, in addition to other functions, interrupts the operation of the spindle rotating motor 59, and the quill motor 37 as explained below. Below the switch 121 there is a deceleration switch 121a which causes the speed of the quill motor 37 to be reduced as the quill approaches the upper limit of its movement.

TOOL EJECTION

Referring to the diagram (FIGS. 19 and 20) it will be assumed that the spindle 24 contains a toolholder and that the quill 21 and spindle 24 are in their uppermost positions shown in FIG. 20 in which the upper limit switch 121 has been closed by engagement with the quill plate 21a thereby closing a circuit including a source V of direct current, 24 volts for instance, and that a switch B has been closed when the spindle rotating motor 59 was stopped; when the tool eject switch TR is closed, current from the positive pole of the current source V will flow through line L1 to energize solenoid valve S1 which is connected by leads L2 to the negative return line N of the current source V. This will cause the piston 162 in the cylinder 162a to move the ground plane locking plate 159 to position to lock the spindle 24 in "up", i.e., retracted position. When the plate 159 moves to locking position, switch C which is connected to line L1 by line L3, closes a circuit including line L4, diode D and line L5, solenoid valve S2 to line L6 leading to the negative return line N. This energizes solenoid valve S2 which supplies air under pressure through the port 152a to the plate 153 of the primary diaphragm 152 which moves the drawbar 140 slightly (in the order of about 0.100 inches) against the force of the drawbar springs 149 to take the pressure of the finger hooks 146 off the shoulder 148 of the toolholder adapter 143 as stated above.

Figure 7:
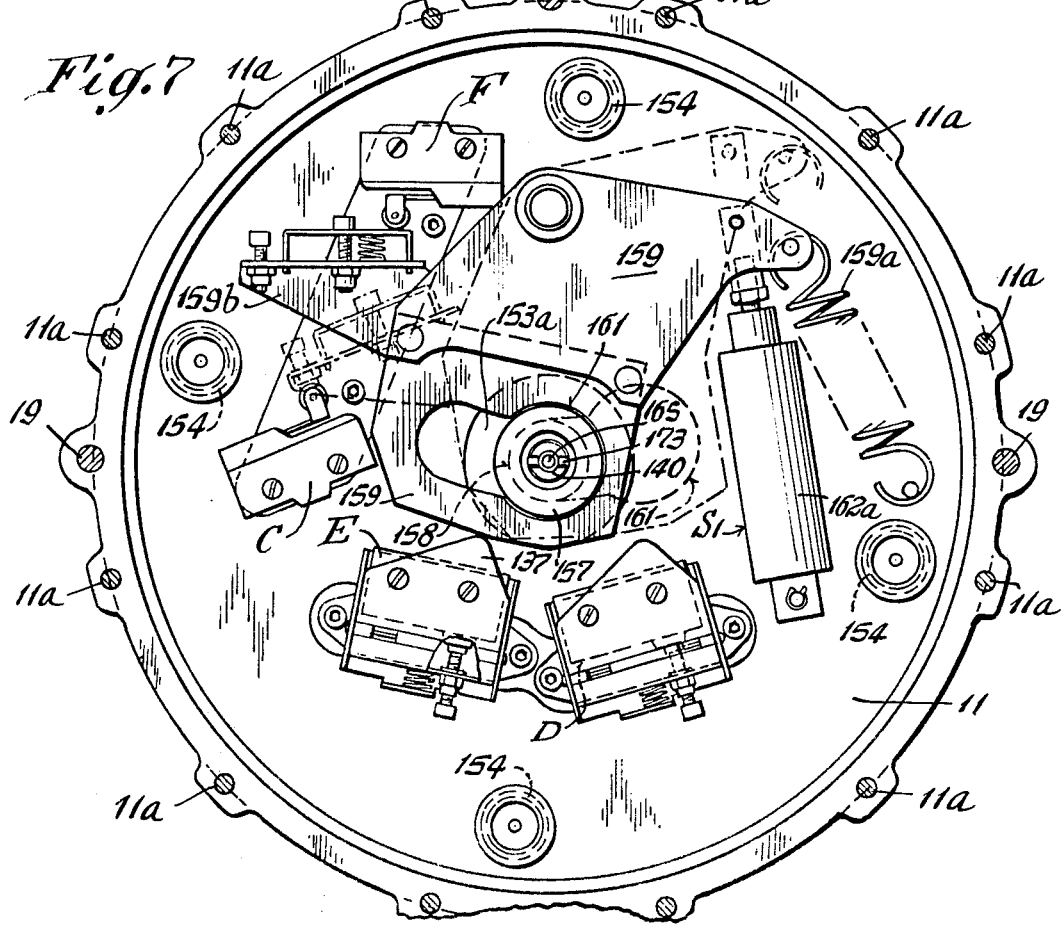
FIG. 7 is a plan view of the base of the dome portion of the spindle unit showing the spindle locking plate, herein sometimes called the ground plane plate, and the means for operating it, including the switches operated by the plate and by the primary diaphragm plate.
Figure 17:
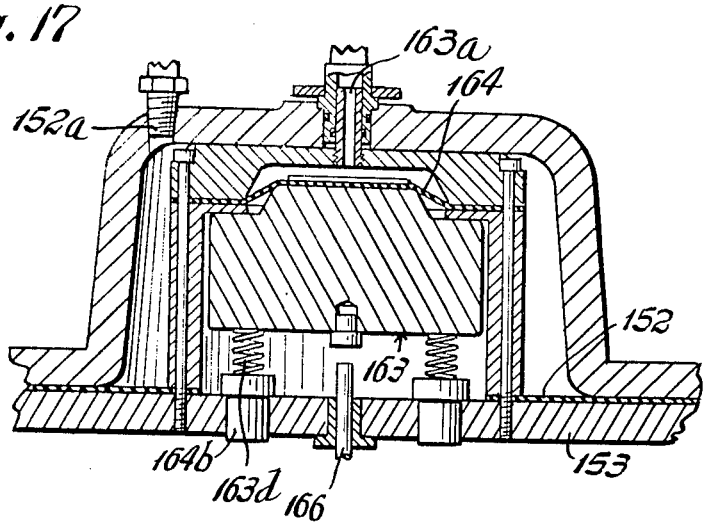
FIG. 17 is a sectional view of a modification of the dome for the spindle shown in FIG. 1 in which the secondary diaphragm carries a large block of metal which is capable of applying a hammer blow to the push rod when the secondary diaphragm is activated.
Figure 18:
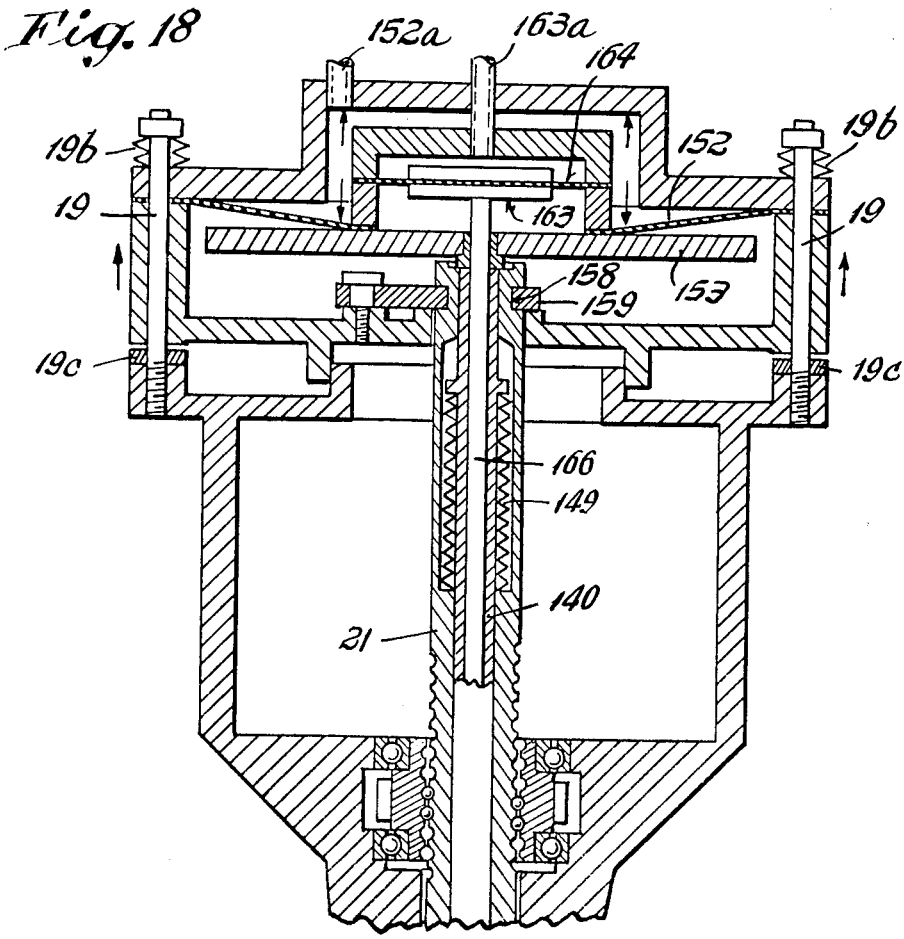
FIG. 18 is a diagrammatic sectional view of the diaphragm for operating the drawbar and push rod showing the means for absorbing the shock applied to the spindle and quill when the diaphragm plate strikes the drawbar and spindle.

When the primary diaphragm plate 153 has been thus operated, a button 133 thereon, see FIGS. 7, 14a and 19, operates the switch D connected to the lead L4 to close a circuit including lead L7 to a solenoid valve S3 which supplies air under pressure to the secondary diaphragm plate 163 through a sliding tube 163a. When thus pressurized, the secondary diaphragm plate 163 operates the push rod 166 to unlock the drawbar fingers 145 and cause them to move clear of the adapter on the toolholder and to strike the top of the adapter to free the toolholder from the spindle so that it may drop into the hand of the operator or be taken by a mechanical hand when the spindle is used with a tool changing machine.

At the beginning of the stroke of the secondary diaphragm plate 163, a switch E mounted on the support 11 is operated to close a holding circuit including positive lead L8, lead L9, lead L5 to solenoid valve S2 and lead L6 connected to the negative lead N so that the solenoid valve S2 will remain energized and the primary diaphragm plate 153 depressed until after the secondary diaphragm plate 163 has been depressurized and the push rod 166 is once again returned to the normal finger-locking position relative to the drawbar. This assures that the finger hooks 146 will be closed around the toolholder of the next tool to be used before the pulling force of the Belleville springs 149 is applied to the toolholder through the medium of the drawbar and hooks.

It should be noted at this point that the switch E is mounted directly on the support 11, see FIG. 14, and has a pivoted lever 137 positioned to be engaged by a pin 139 (which projects through an aperture in the primary diaphragm plate 153) that is mounted on a leaf spring 139a carried by the plate 153. The pin 139 is so positioned as to not engage the lever 137 of the switch E (see FIG. 14) when the plate 153 is moved downwardly, but is held up when the plate 153 descends since the leaf spring 139a is supported by a shoulder of pin 165, which at this time is brought into contact with the push rod 166 and subsequently supported by push rod 166 as plate 153 continues to descend.

When the secondary diaphragm 164 is pressurized and its plate 163 descends, the pin 165 moves downwardly and permits leaf spring 139a to descend, which forces the pin 139 to engage the lever 137 and move the switch E to closed position.

The parts stay in said positions with the holding circuit switch E closed and with the finger hooks 143 on the drawbar released as shown in FIG. 13 until the current feeding the switch E is interrupted as by shutting down the machine, for instance, or when a new tool is inserted into the spindle and solenoid valve S3 is deenergized to release the secondary diaphragm 164, raise the push rod 166 to engage the hooks and subsequently lift pin 165 to raise leaf spring 139a. At this time the switch E opens the holding circuit including lead L9 to the solenoid valve S2 for the primary diaphragm 152 which allows the drawbar to rise and draw the tool into the spindle. At the same time the circuit to the solenoid valve S1 is opened depressurizing the cylinder 162 and causing the ground plane locking lever 159 to disengage the spindle and close the switch F.

Switch F is activated by the ground plane locking plate 159 when the latter is fully withdrawn from engagement with the spindle 24 as shown in FIG. 7 and closes circuits leading to the spindle rotating motor 59 and the quill operating stepping motor 37. The switch F also serves to indicate that the tool change cycle is complete and that the power drawbar is in tool retention position.

TOOL RETENTION SEQUENCE

Before a toolholder can be inserted in the spindle 24, the mechanism, including the toggle switch TR must be in "eject" condition in which the finger hooks 145 are in position to engage the adapter on the toolholder. The toolholder is inserted in the nose of the spindle and firmly supported there. Then the toggle switch TR is placed in "retention" position (see FIG. 19) in which it opens the circuits to the solenoid valves S1 and S3 and permits them to exhaust. The solenoid valve S1 will remove the pressure from the cylinder 162a that holds the spindle 24 engaged with the ground plane lever 159, but the latter remains engaged with the spindle 24 because it is mechanically held there by the pressure imposed by the primary diaphragm 152 and plate 153. Solenoid valve S3 will exhaust the secondary diaphragm 164, thereby allowing the push rod 166 to rise, releasing the finger hooks 146 so that they may spring inwardly and engage the adapter on the new toolholder and continue upward causing the ring 177 to lock the fingers 146 in adapter holding position shown in FIG. 8.

When the finger hooks 145 are fully engaged with the toolholder, the push rod 166 will have returned to its initial position where it will open switch E which will result in deactivating solenoid valve S2 removing pressure from the primary diaphragm 152. When this occurs the force on the expanding Belleville springs 149 is released allowing the springs 149 to apply their force on the drawbar 140 which pulls the toolholder inwardly of the spindle and tightly holds it there.

When the force of the Belleville springs 149 is transferred to the toolholder, it is removed from the spindle ground plane plate 159 which is then free to be returned by its spring 159a to unlocking position in which switch F is closed to activate a signal via leads L10 and L11 to indicate the completion of the tool retention cycle of operations, see FIG. 19.

When the spindle is used with automatic tool changing mechanism such as disclosed herein, the switch F (see FIG. 19) is included in a circuit indicating that the tool change operation has been completed and initiating operation of the spindle.

When the spindle of the present invention is used with a machine tool in which the toolholders are inserted in and removed from the spindle manually, the closing of the switch F may enable circuits which initiate the operation of the motor 59 for rotating the tool and the stepping motor 37 for operating the quill, as will appear below.

It is convenient, as shown in FIG. 7, to mount the switches C, D, E and F on the support 11 of the bonnet under the diaphragm plate 153. The switch D is operated by a button 133 on the diaphragm plate 153 and the switches C and F are operated by the ground plane locking plate 159. The operation of switch E has already been explained in detail above.

Variations and modifications may be made within the scope of the claims and portions of the improvements may be used without others.

We claim:

1. A spindle unit for a machine tool having a spindle; means for mounting the spindle for rotation; means for rotating the spindle comprising a motor and change speed means between the motor and the spindle, said change speed means having a high speed position, a low speed position and a neutral position; control means; spring operated means responsive to said control means to move said change speed means to high speed position; means responsive to said control means for reducing the speed of rotation of the motor; first power operated means responsive to said control means for moving said change speed means to neutral position; second power operated means responsive to said control means for moving said change speed means to low speed position; locking means for locking said change speed means in high speed, low speed or neutral positions; means controlled by said control means and responsive to the then position of said change speed means for releasing said locking means; selectively operable means responsive to the release of said locking means for energizing said means for moving the change speed means to low speed position or neutral position, said change speed means including separable interengaging elements, and said means for moving said change speed means to low speed position including timing switch means which discontinues the energization of said second power operated means if, after the lapse of a predeterminate time, said interengaging elements have not been moved into proper interengagement in low speed position, and energizing said second power operated means to move the change speed means to neutral position, said timing switch means being constructed and arranged to cause the change speed means to be again moved, after the lapse of a determinate time, back to low speed position, said successive movements between low speed position and neutral position being repeated until the interengaging elements properly engage in low speed position; and means responsive to the arrival of the change speed means in low speed position for deenergizing said first and second power operated means.

2. A spindle unit for a machine tool as defined in claim 1 in which there are means for preventing the energization of said means for moving the change speed means to one of said positions when the change speed means is in that position.

3. A spindle unit for a machine tool according to claim 1 in which said means responsive to the arrival of the change speed means at low speed position locks the change speed means in low speed position.

4. A spindle unit for a machine tool according to claim 1 in which there are means responsive to the control means for moving said change speed means while the spindle is rotating to high speed position, including means for causing said locking means to be released to permit said change speed means to move to high speed position by said spring operated means; and means responsive to the arrival of the change speed means at high speed position for causing the locking means to again become operative and lock the change speed means in high speed position.

5. A spindle unit for a machine tool as defined in claim 1 in which there are control means for activating said first power operated means for moving said change speed means to neutral position.

6. A spindle unit for a machine tool as defined in claim 1 in which there are manually operable means for activating said first power operated means for moving said change speed means to neutral position.

7. A spindle unit for a machine tool as defined in claim 1 in which there are manually operable means for activating said second power operated means for moving said change speed means to neutral position.

8. A spindle unit for a machine tool according to claim 1 in which said change speed means comprises a sleeve, and said means for shifting said sleeve to low speed position comprises cylinder and piston means affixed to said sleeve.

9. A spindle unit for a machine tool according to claim 1 in which said change speed means comprises a sleeve, and said means for shifting said sleeve to neutral position comprises cylinder and piston means affixed to said sleeve.

10. A spindle unit for a machine tool as defined in claim 1 in which said means for shifting said sleeve to neutral position comprises cylinder and piston means having a short stroke and said means for shifting said sleeve to low speed position comprises cylinder and piston means having a long stroke.

11. A spindle unit for a machine tool having a spindle; means for mounting the spindle for rotation; means for rotating the spindle comprising a motor and change speed means between the motor and the spindle, said change speed means having a high speed position, a low speed position and a neutral position; control means; spring operated means responsive to said control means to move said change speed means to high speed position; means responsive to said control means for reducing the speed of rotation of the motor; first power operated means responsive to said control means for moving said change speed means to neutral position; second power operated means responsive to said control means for moving said change speed means to low speed position; locking means for locking said change speed means in high speed, low speed or neutral positions; means controlled by said control means and responsive to the then position of said change speed means for releasing said locking means; selectively operable means responsive to the release of said locking means for energizing said means for moving the change speed means to low speed position or neutral position; means for causing said locking means to release said change speed means and permit the latter to be moved to high speed position by said spring operated means, said change speed means including separable interengaging elements; and means including timing switch means for causing said change speed means to move to neutral position if, after the lapse of a predetermined time, said interengaging elements have not been moved into engagement in high speed position, said timing switch means being constructed and arranged to cause the change speed means to be moved again, after the lapse of a predetermined time, back to neutral position, said successive movements between high speed position and neutral position being repeated until the interengaging elements properly engage in low speed position; and means responsive to the arrival of the change speed means in high speed position for deenergizing said first and second power operated means.

* * * * *

UNITED STATES PATENT AND TRADEMARK OFFICE
CERTIFICATE OF CORRECTION

PATENT NO. : 4,008,647
DATED : February 22, 1977
INVENTOR(S) : Robert Z. Hague et al It is certified that error appears in the above-identified patent and that said Letters Patent are hereby corrected as shown below:

Column 1, line 6 "out" should be --our--
Column 5, line 23 "alsp" should be --also--
Column 8, line 2 "or" should be --to--
Column 9, line 43 "fngers" should be --fingers--
Column 11, line 47 "180:" should be --180°--
Column 12, line 31 "D" should be --$D^1$--.

Signed and Sealed this

Third Day of May 1977

[SEAL]

Attest:

RUTH C. MASON
Attesting Officer

C. MARSHALL DANN
Commissioner of Patents and Trademarks